United States Patent [19]

Yoo et al.

[11] Patent Number: 5,151,186
[45] Date of Patent: Sep. 29, 1992

[54] METHOD FOR CLEANING FILTER DISKS AND SYSTEM THEREFOR

[75] Inventors: Taek J. Yoo; Yong N. Jang; Wook H. Oh; Chan S. Jeong, all of Kyongi, Rep. of Korea

[73] Assignee: SKC Limited, Suwon, Rep. of Korea

[21] Appl. No.: 701,679

[22] Filed: May 16, 1991

[30] Foreign Application Priority Data

May 21, 1990 [KR] Rep. of Korea ............... 90-7259
Oct. 10, 1990 [KR] Rep. of Korea ............... 90-15511

[51] Int. Cl.⁵ ............................................ B01D 35/20
[52] U.S. Cl. .................................... 210/541; 210/542
[58] Field of Search ............ 210/394, 393, 384, 408, 210/785, 541, 542, 748; 134/1, 184

[56] References Cited

U.S. PATENT DOCUMENTS 5,039,347  8/1991  Hindstrom et al. ............... 210/394

FOREIGN PATENT DOCUMENTS 893183  6/1989  Finland.

Primary Examiner—Frank Sever
Attorney, Agent, or Firm—William F. Pinsak; Thomas J. Dodd

[57] ABSTRACT

A novel automated filter cleaning system capable of removing contaminants clogging the filter disk without having to resort to the operator's manual operation is disclosed. The system comprises a turntable or filter magazine for holding the filter disks in a stacked condition, a first ultrasonic cleaner for applying an ultrasonic field to one side of the filter disk, a second ultrasonic cleaner for applying an ultrasonic field to the other side of the filter disk, a water injection cleaner for removing residual contaminants from the ultrasonically cleansed filter disk, a robotic carrier for transporting the filter disk from a particular station to another, and a controller for controlling the overall operation of the filter cleaning system. A method is also provided for cleaning the filter disk by a combined action of ultrasonic treatment and water injection.

5 Claims, 3 Drawing Sheets

METHOD FOR CLEANING FILTER DISKS AND SYSTEM THEREFOR

FIELD OF THE INVENTION

The present invention relates generally to a system for cleaning filter disks employed in the production line of polymeric films; and, more particularly, to a novel automated filter cleaning system capable of cleaning or regenerating used filter disks through a combined use of ultrasonic and water injection treatment. The present invention is also directed to a novel method for cleaning filter disks which is applicable to the automated filter cleaning system; and further pertains to an improved ultrasonic cleaner for use with the automated filter cleaning system and a method of using same.

DESCRIPTION OF THE PRIOR ART

As is known in the art, such polyester film used as a recording medium may be produced by way of extruding liquid polymer, e.g., molten polyester, in the form of a thin film. In the process of such film production, filter disks are employed to screen contaminants present in the molten polymer which would otherwise deteriorate the film quality. Such filter disks gradually become clogged by the contaminants over time; and sooner or later become no longer usable. As a result, the plant operators manually regenerate these used filter disks through physical and/or chemical treatment.

U.S. Pat. No. 4,753,259 discloses an arrangement for cleaning components using the ultrasonic technology. This arrangement generates a strong ultrasonic field in a limited space to remove contaminants clogging the filters.

U.S. Pat. No. 4,946,602 involves a method of cleaning filter disks in a suction dryer by use of ultrasonic vibration wherein ultrasound is applied to the filter disks as they are rotated within a basin which contains a level of cleaning liquid. Upon completion of the ultrasonic cleaning operation, a suction air flow passes through the filter disks to gather the filtrate as well as to dewater from the filter disks.

These prior art cleaning apparatus and methods discussed above possess a major deficiency in that the operator should manually load or unload the filter disks onto the cleaning apparatus before, after and during the cleaning operation. Further, it is cumbersome and laborious to turn over the filter disks on a disk-by-disk basis after cleaning one side of the filter disk.

In order to exactly adjust the gap or distance between one side of the filter disk and the tip of the ultrasonic vibrator, for example, the operator must manipulate the adjustment handle to move the vibrator toward or away from the filter disk whenever it is necessary to load or unload it. Operational problems may be encountered in the course of adjusting the distance between the filter disk and the ultrasonic vibrator: in other words, an incorrect adjustment of the gap may result in an inadequate cleaning of the filter disk, which means that a substantial amount of contaminants may remain even after the ultrasonic cleaning operation. The residual contaminants may be introduced into the filtered molten polymer, thereby deteriorating the film quality.

Moreover, conventional ultrasonic cleaners tend to generate a great deal of noise, e.g., more than 110 dB, creating a health hazard. Accordingly, a need has existed for an improved filter cleaning system which does away with these deficiencies.

SUMMARY OF THE INVENTION

It is an object of the present invention, therefore, to provide an automated filter cleaning system capable of removing contaminants stuck in the filter disk in a more efficient and effective manner without having to resort to the operator's manual operation.

Another object of the present invention is to provide a filter cleaning method which can effectively regenerate a used filter disk by way of removing contaminants clogging the filter disk through a combined use of ultrasonic and water treatment.

A further object of the present invention is to provide an improved ultrasonic cleaner designed to accommodate a filter disk in a speedy and precise manner and then expose the filter disk to an ultrasonic field with uniformity.

In one aspect of the present invention, a novel system is provided for cleaning a plurality of filter disks, which comprises: a turntable including a plurality of vertical posts capable of holding said filter disks in a stacked condition one above another, said vertical posts being supported by a plurality of horizontal arms, said horizontal arms extending radially outwardly from a common rotational shaft; a first ultrasonic cleaner for accommodating one of the filter disks to apply an ultrasonic field to a first side of the filter disk as the filter disk rotates horizontally under a level of a cleaning liquid; a second ultrasonic cleaner for accommodating the filter disk transported from said first ultrasonic cleaner and then applying said ultrasonic field to a second side of the filter disk; a water injection cleaner for subjecting the filter disk transported from said second ultrasonic cleaner to a water flow so as to remove residual contaminants from the ultrasonically cleaned filter disk; a robotic carrier for transporting the filter disk successively from said turntable to said first ultrasonic cleaner, then to said second ultrasonic cleaner and finally to said water injection cleaner, said robotic carrier being adapted to turn the filter disk over when the transportation is made between said first and second ultrasonic cleaners; and means for controlling each step of operations involved in said filter cleaning system.

In another aspect of the present invention, a novel method is provided for regenerating used filter disks stacked on a turntable including a plurality of vertical supply and recovery posts by a combined used of ultrasound and water flow, said method comprising the steps of: transporting one of the used disks from a supply post of the turntable to a first ultrasonic cleaner; applying an ultrasonic field to a first side of the filter disk within the first ultrasonic cleaner as the filter disk rotates horizontally under a level of a cleaning liquid such as water; transporting the filter disk from the first ultrasonic cleaner to a second ultrasonic cleaner and placing the filter disk within the second ultrasonic cleaner so that a second side of the filter disk faces upward; applying said ultrasonic field to the second side of the filter disk within the second ultrasonic cleaner as the filter disk rotates under a level of said cleaning liquid; subjecting the filter disk to a water injection within a water flow cleaner so as to remove residual contaminants from the filter disk; and transporting the cleaned filter disk from the water injection cleaner to a recovery post of the turntable.

In a further aspect of the present invention, an improved ultrasonic cleaner is provided for cleaning a filter disk by way of applying an ultrasonic field to at least one side of the filter disk during its horizontal rotation, which comprises: a rigid frame; a basin mounted on said frame for containing a level of a cleaning liquid such as water, said basin having a central hollow boss; a rotor concentrical with said basin and rotatable to cause a horizontally rotational movement of the filter disk, said rotor including an upper larger diameter extension and a lower smaller diameter extension, said upper extension having a disk landing surface, said lower extension having an axial bore; means for causing said rotor to rotate with the filter disk placed on the landing surface of said rotor; an elevator member including an elongated rod and a saddle positioned on the top end of the rod, said elongated rod being inserted through an axial bore of the lower extension of said rotor, said elevator member being movable between an uppermost position in which the filter disk is landed on the saddle and a lowermost position in which the filter disk undergoes said ultrasonic cleaning treatment; means for causing said elevator member to move between said uppermost and lowermost positions; and an ultrasound applicator for applying said ultrasonic field to one side of the filter disk as it rotates horizontally at said lowermost position.

BRIEF DESCRIPTION OF THE DRAWINGS

The above and other objects and features of the present invention will become apparent from the following description and the accompanying drawings wherein like reference numerals refer to like parts in different views.

DETAILED DESCRIPTION OF THE INVENTION

Figure 1:
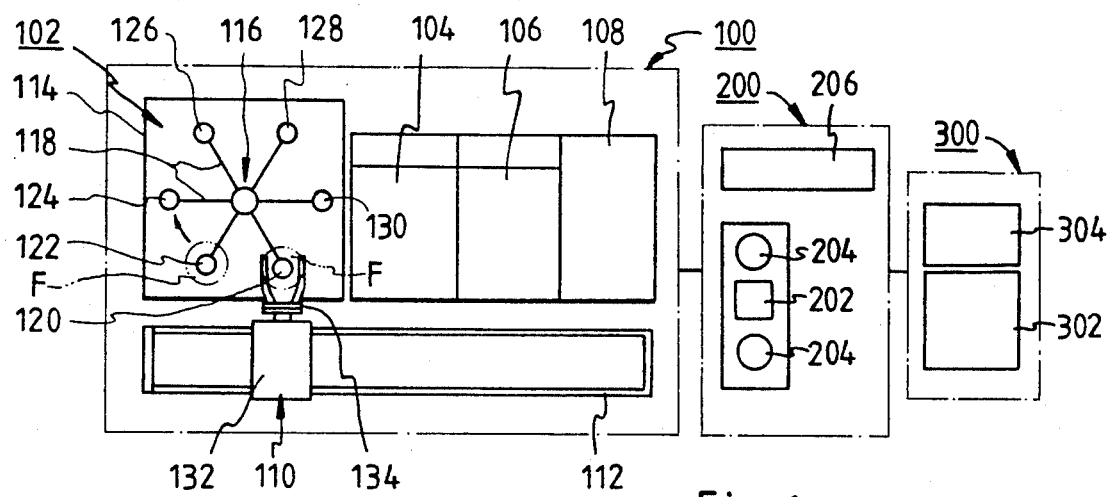
FIG. 1 is a schematic view showing an embodiment of the filter cleaning system in accordance with the present invention.

Referring now to FIG. 1, there is shown a filter cleaning system in accordance with the present invention. The filter cleaning system may generally be categorized into a cleaning part 100, a power supply part 200 designed to provide the cleaning part 100 with appropriate hydrostatic and/or electric power and a control part 300 governing overall operations of the cleaning part 100 and the power supply part 200.

The cleaning part 100 comprises a turntable or filter magazine 102 holding a stack of filter disks F one above another, a first ultrasonic cleaner 104 for applying an ultrasonic field to a first side of a given filter disk, a second ultrasonic cleaner 106 for applying ultrasonic field to a second side of the filter disk and a water injection cleaner 108 for removing residual contaminants from the filter disk which has already been subjected to ultrasonic cleaning treatments. The filter disk F is transported from one station to another by means of a robotic carrier 110 that runs along a guide rail 112.

Further, the power supply part 200 comprises a hydraulic pump 202 for supplying the cleaning part 100 with a pressurized fluid, e.g., oil, a water filter 204 adapted to strain said cleaning liquid, e.g., water, prior to its supply to each of the cleaners 104, 106 and 108, and a water pump 206 for providing the water injection cleaner 108 with pressurized water. Operation of the cleaning part 100 and the power supply part 200 is governed by the control part 300 which includes a programmable controller 302 and an ultrasonic oscillator 304.

As schematically shown in FIG. 1, the turntable 102 includes a base 114 and a support frame 116 rotatably mounted on the base 114. The support frame 116 consists of a plurality of arms 118 extending radially outwardly from their common shaft or frame 116. While six such arms are shown in FIG. 1, this is for illustrative purpose only; and the actual number used can be either greater or smaller. Extending vertically upwardly from the outside ends of the arms 118 are six posts 120, 122, 124, 126, 128 and 130 for holding 6 stacks of filter disks F one above another. The support frame 116 of the turntable 102 is rotated by a predetermined angle, for example 60°, in a direction designated by an arrow each time when the filter disks F stacked on a given post are cleaned in their entirety. For instance, a first supply post 120 holds a stack of uncleaned filter disks whereas a second recovery post 122 retains cleaned ones. Upon completion of cleaning operations for the filter disks stacked on the first post 120, the support frame 116 rotates in a clockwise direction by 60° so that the first post 120 replaces the second post 122, the sixth post 130 replaces the first post 120 and so on.

Figure 2:
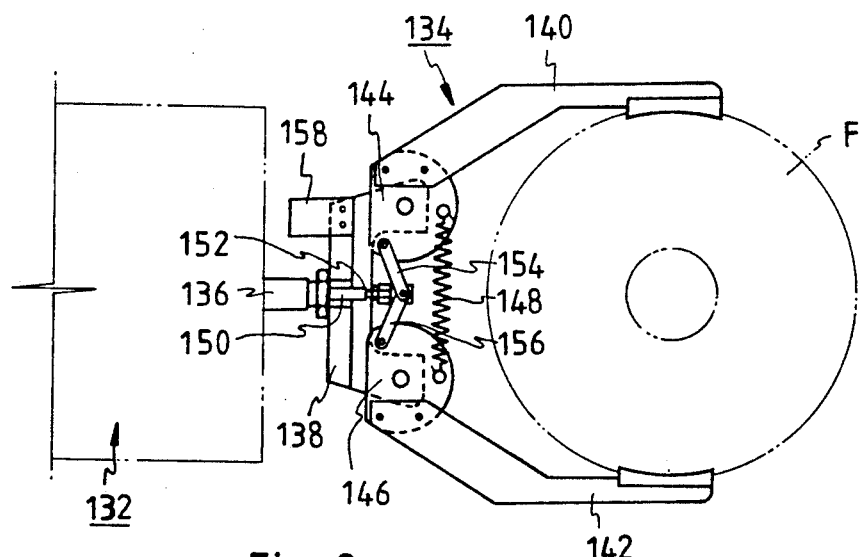
FIG. 2 is an enlarged top view illustrating the gripper portion of the robotic carrier employed in the filter cleaning system as shown in FIG. 1.

The robotic carrier 110 includes a body 132 movable in the X-axis direction along the guide rail 112 and a gripper 134 carried by the body 132. Referring to FIG. 2, there is shown in detail the gripper 134 of the robotic carrier 110 which comprises a shaft 136 rotatably and extendibly mounted on the body 132. Attached to the shaft 136 is a bracket 138, the opposite ends of which carry a pair of pivotable plates 144 and 146. A first finger 140 and a second finger 142 are fixedly mounted on the pivotable plates 144 and 146 respectively in such a manner that they can move toward or away from each other. The first finger 140 is normally biased toward the second finger 142 by means of a spring member 148 extending between the pivotable plates 144 and 146.

Moreover, the shaft 136 of the gripper portion 134 carries a pneumatic or hydraulic actuator 150 having a piston rod 152 which can be extended or retracted with respect to the body of the actuator 150. The piston rod 152 has a free end operatively connected to each of the pivotable plates 144 and 146 through a pair of link members 154 and 156. Thus, the first finger 140 will move away from the second finger 142 to release the filter disk F when the piston rod 152 is extended by the action of pneumatic or hydraulic pressure. In contrast, retraction of the piston rod 152 will cause the first and second fingers 140 and 142 to move toward each other so that the filter disk F can be clamped between the fingers. It should be appreciated that the gripper 134 may be rotated about an axis of the shaft 136. Rotational movement of the gripper 134 is preferably limited by means of a stopper 158.

Figure 4:
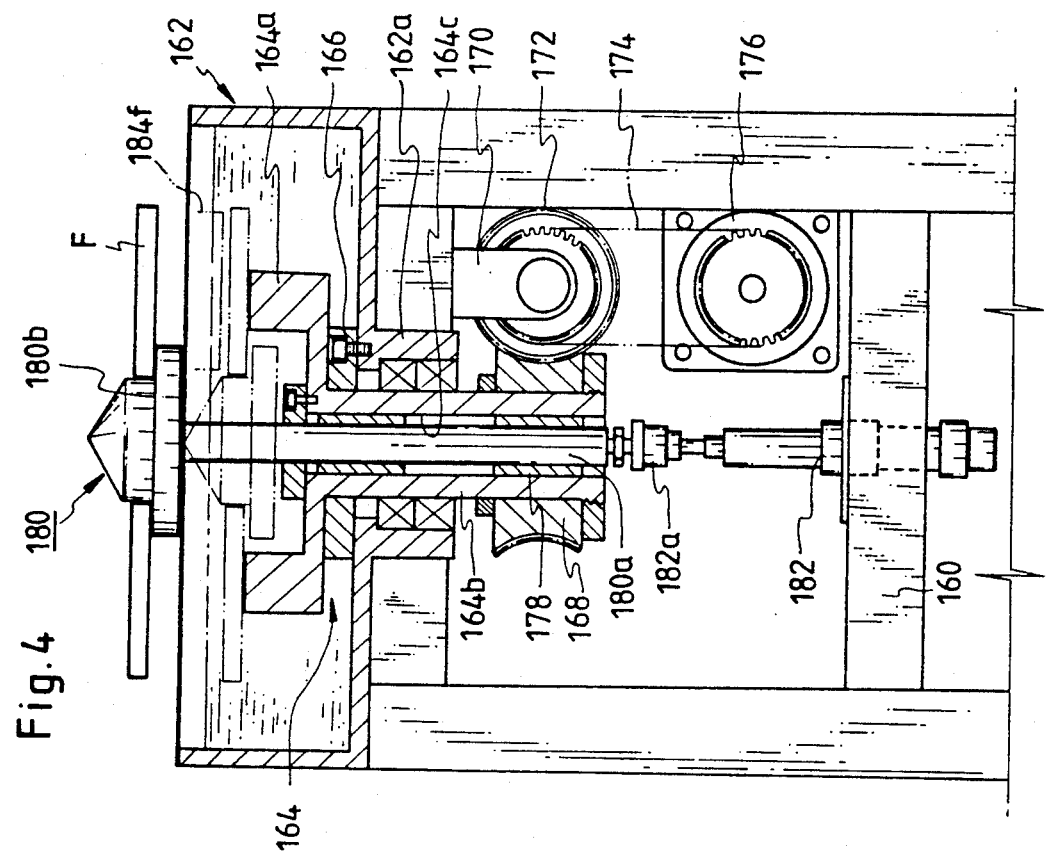
FIG. 4 is an enlarged sectional view of the ultrasonic cleaner with the ultrasound applicator thereof removed in its entirety.
Figure 3:
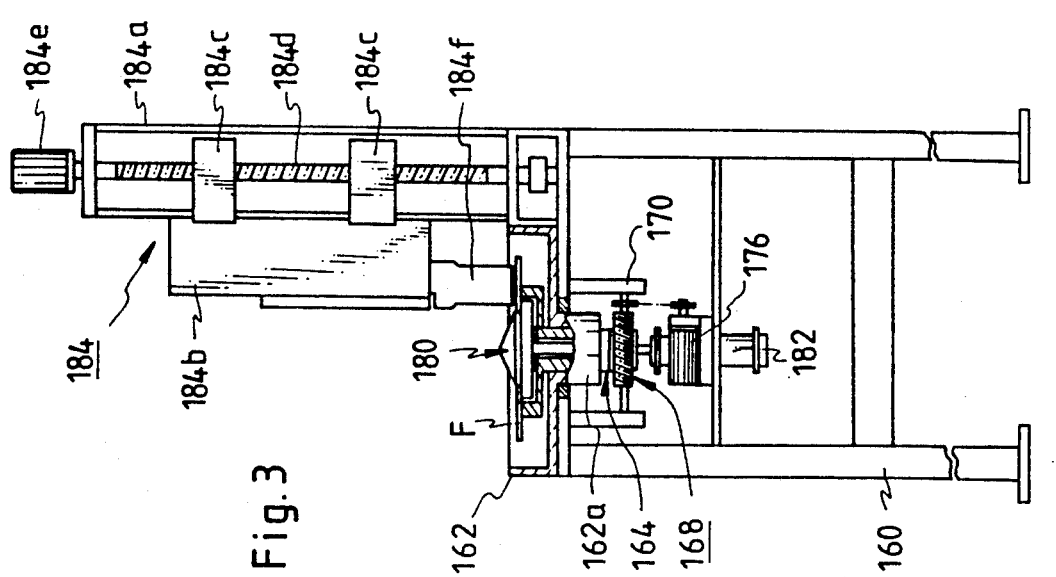
FIG. 3 is a side elevational view of an embodiment of the ultrasonic cleaner which may be employed as a first and a second ultrasonic cleaners in the filter cleaning system as depicted in FIG. 1, a portion of the cleaner being removed for clarity.

Referring to FIG. 3 and FIG. 4, there is shown an embodiment of the ultrasonic cleaner in accordance with the present invention. This ultrasonic cleaner, which may be used as a first and a second ultrasonic cleaners, e.g., 104 and 106, in the novel filter cleaning system shown in FIG. 1, comprises a rigid frame 160 and a basin 162 fixedly mounted on the frame 160. The basin 162 is designed to contain a level of cleaning liquid. Although any suitable liquid material may be employed as the cleaning liquid, water has been found to work well. The basin 162 has a central hollow boss 162a through which a rotor 164 is inserted in a rotatable condition. Such rotor 164 includes an upper larger diameter extension 164a having a disk landing surface at its top end and a lower smaller diameter extension 164b which is journalled through the hollow boss 162a of the rotor 164 by means of suitable radial bearings. A sealing member 166 serves to prevent the cleaning liquid contained in the basin 162 from leakage.

Keyed onto the lower extension 164b is a worm wheel 168 that engages or meshes with a worm 172, the shaft of which is rotatably mounted on the rigid frame 160 by means of a support bracket 170. The worm 172 is operatively connected to a driving motor 176 through a chain or belt 174.

An elevator member 180 is loosely fitted into the axial bore 164c of the rotor 164 in such a manner as to allow its axial sliding movement under a frictional contact with bushings 178. The elevator member 180 includes an elongated rod 180a and a saddle 180b provided on the top end of the elongated rod 180a. The saddle 180b is so shaped and sized that it can receive or accommodate the filter disk F from the robotic carrier 110 in a stable condition. Mounted on the rigid frame 160 is a pneumatic or hydraulic actuator 182 including a piston rod 182a which is coupled to the lower end of the elongated rod 180a. Accordingly, if the piston rod 182a either extends or retracts with respect to the body of the actuator 182, the elevator member 180 will move between an uppermost position in which the filter disk F is landed over the saddle 180b from the robotic carrier 110 and a lowermost position in which the filter disk F can be subjected to a cleaning action by ultrasonic field. When the elevator member 180 is in its lowermost position, the filter disk F will be supported on the disk landing surface of the rotor 164, under which condition the filter disk F is rotatable with the rotor 164 as set forth above.

As clearly shown in FIG. 3, the ultrasonic cleaner further comprises an ultrasound applicator 184 located on the rigid frame 160 in a position adjacent to the basin 162. The ultrasound applicator 184 includes a vertical support 184a, a movable casing 184b slidably mounted on the support 184a, a ball screw 184d threadedly engaged with the legs 184c of the movable casing 184b and a driving motor 184e for rotating the ball screw 184d in either clockwise or counter clockwise direction to cause the movable casing 184b to descend or ascend along the vertical support 184a. Housed within the movable casing 184b is an ultrasonic vibrator 184f, the lower end of which extends downwardly from the movable casing 184b. The ultrasonic vibrator 184f will vibrate upon supply of an ultrasonic energy from the ultrasonic oscillator 304 shown in FIG. 1 so as to apply an ultrasonic field to the filter disk F. A first side of the filter disk F facing the ultrasonic vibrator 184f will be subjected to a uniform ultrasonic cleaning action, because the filter disk F is rotated at a predetermined angular velocity by the rotor 164 during the process of ultrasonic field application. Contaminants stuck to the filter disk F tend to either fall into the cleaning liquid or become susceptible of removal in the later water injection process. While the frequency of ultrasound depends on the type of filter disks employed and/or the severity of contamination, 15 to 20 KHz has been found to work well in most cases.

Figure 5:
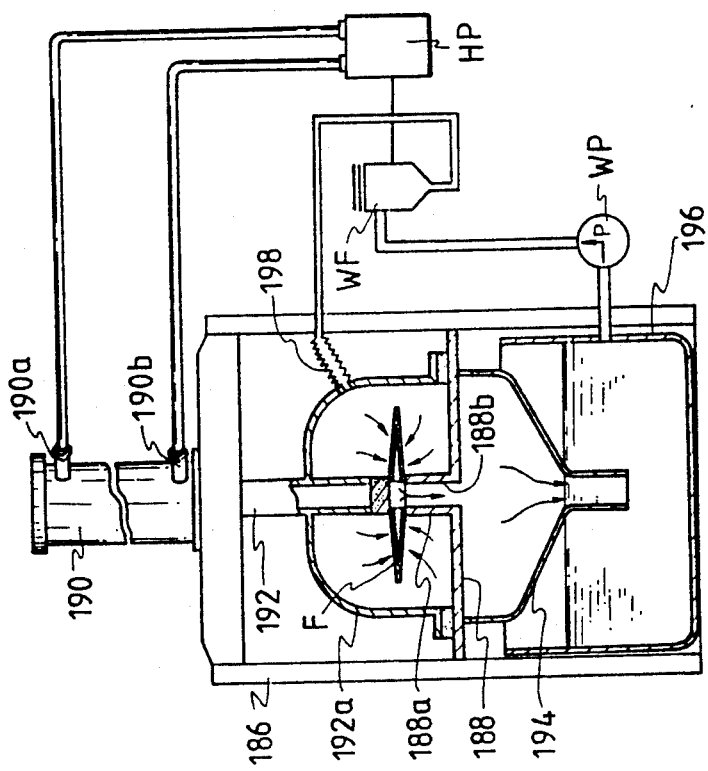
FIG. 5 shows an embodiment of the water injection cleaner which constitutes the filter cleaning system as shown in FIG. 1.

Turning now to FIG. 5, there is illustrated a water injection cleaner which constitutes a portion of the filter cleaning system in accordance with the present invention, e.g., 108 shown in FIG. 1. The water injection cleaner includes a rigid frame 186 and a horizontal partition wall 188 having an upwardly extending boss 188a through which an axial flow path 188b is formed for fluid communication purpose. Mounted on the top wall of the rigid frame 186 is a pneumatic or hydraulic actuator 190 consisting of a piston rod 192 which has a bell-shaped enclosure member 192a in the vicinity of its free end. A drainage 194 is formed under the horizontal partition wall 188 to collect cleaning water used and direct it to a reservoir 196 located thereunder. Pressurized water is pumped through a water filter WF and then a flexible supply line 198 into the enclosure member 192a by a water pump WP whereas a pressurized fluid, e.g., motor oil is supplied to the actuator 190 by a pneumatic or hydraulic pump HP.

In operation, if the pressurized fluid is supplied from the pneumatic or hydraulic pump HP through a first port 190a into the actuator 190, the piston rod 192 extends in a downward direction until the enclosure member 192a comes into contact with the partition wall 188 so as to form a cleaning chamber as shown in FIG. 5. Within the cleaning chamber, an ultrasonically cleaned filter disk F is held in place between the top end of the boss 188a and the free end of the piston rod 192. Pressurized water ranging from 3 to 7 kg/cm$^2$ in its pressure is injected into the cleaning chamber through the flexible supply line 198 preferably in an intermittent period. Such pressurized water functions to remove residual contaminants still stuck to the filter disk F as it passes through the disk and then the axial flow path 188b as indicated by arrows. When the water injection cleaning process comes to an end, a pressurized fluid is supplied to the actuator 190 through its second port 190b, thereby causing the piston rod 192 to retract in an upward direction.

Figure 6:
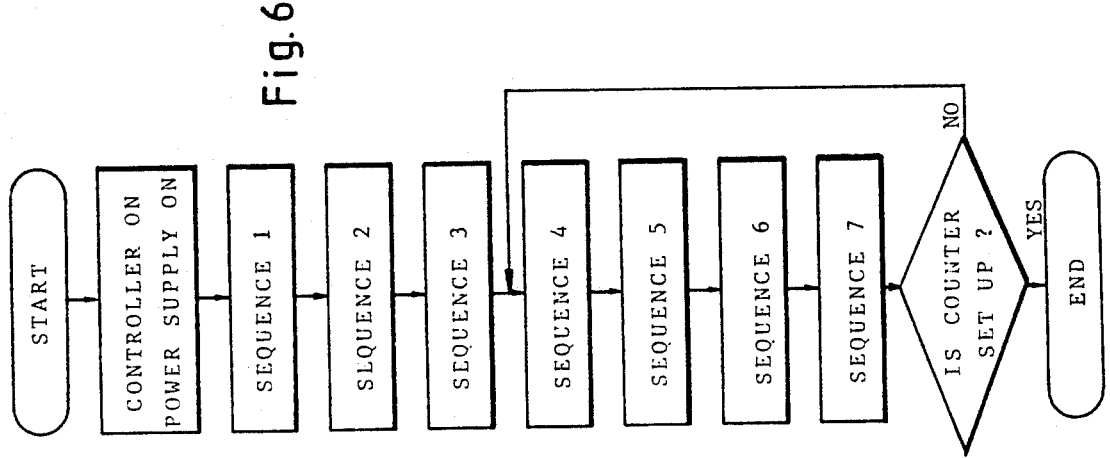
FIG. 6 is a flow chart showing the operation sequence of the filter cleaning system in accordance with the present invention.

Each step of the operations of the filter cleaning system in accordance with the present invention will now be described with reference to FIG. 1 and FIG. 6.

In the initial stage, the control part 300 and the power supply part 200 are switched on by the operator in preparation for a series of cleaning operations carried out in the cleaning part 100.

In operation sequence 1, the robotic carrier 110 grips or clamps one of the uncleaned filter disks F stacked on a first supply post, e.g., 120; and then transports it to the first ultrasonic cleaner 104 in which a first side of the filter disk is cleaned ultrasonically, as discussed above with reference to FIG. 3 and 4.

In operation sequence 2, the filter disk within the first ultrasonic cleaner 104 is transported to the second ultrasonic cleaner 106 wherein a second side of the filter disk is cleaned. In this sequence, the robotic carrier will have to turn over the filter disk so that the remaining uncleaned surface of the filter disk can face the ultrasonic vibrator.

In operation sequence 3, a second filter disk is transported from the first post 120 of the turntable 102 to the first ultrasonic cleaner 104 wherein one side of the filter disk is cleaned in an ultrasonic field. It should be noted that the operation carried out in sequence 3 is basically the same as that of sequence 1.

In operation sequence 4, the robotic carrier 110 transports the filter disk located within the second ultrasonic cleaner 106 to the water injection cleaner 108. As previously described with reference to FIG. 5, the water injection cleaner 108 causes pressurized water to pass through the filter disk, thereby removing residual contaminants from the filter disk.

In operation sequence 5, the filter disk placed within the first ultrasonic cleaner 104 is transported to the second ultrasonic cleaner 106. As in sequence 2, the remaining side of the filter disk is cleaned within the second ultrasonic cleaner 106 by way of exposing same to an ultrasonic field.

In operation sequence 6, a third filter disk is trasported from the first post 120 of the turntable 102 to the first ultrasonic cleaner 104 and is subsequently subjected to an ultrasonic cleaning action as in sequences 1 and 3.

In operation sequence 7, the robotic carrier 110 transports the completely cleaned filter disk placed within the water injection cleaner 108 to the recovery post, i.e., the second post 122 of the turntable 102.

Then, the controller 302 determines if the counter is set up or zero. In case where the answer is "YES", the controller 302 finishes the cleaning operations for the filter disks stacked on the first post 120. If the answer is "NO", operation sequences 4 to 7 will be repeated until all of the filter disks supplied on the first post 120 are cleaned. Once the cleaning operations for the first stack of filter disks come to an end, the vertical support 116 will be caused to rotate by 60° in the direction as indicated by an arrow. This results in the first post 120 superseding the second post 122 and the sixth post 130 replacing the first post 120. The uncleaned filter disks stacked on the sixth post 130 will be then subjected to the cleaning treatments through the same operation sequences as illustrated in FIG. 6.

As shown and discussed above, the turntable constituting the filter cleaning system in accordance with the preferred embodiment of the present invention may include as many as six posts equally spaced along a circumferential line. Accordingly, the filter cleaning system should continue to operate until all the filter disks stacked on the first to sixth posts are cleaned or regenerated by the combined use of ultrasonic bombardment and water injection treatments. It is important to note that although the filter cleaning system described above employs a single set of the first ultrasonic cleaner, the second ultrasonic cleaner and the water injection cleaner, two or more sets of these cleaners may well be used for the purpose of increasing the processing capability of the filter cleaning system.

While the present invention has been shown and described with reference to a particular embodiment, it will be apparent to those skilled in the art that many changes and modifications may be made without departing from the spirit and scope of the invention as defined in the claims.

What is claimed is:

1. A system for continuously supplying, cleaning and recovering a succession of filter disks which comprises:
   a turntable including a plurality of vertical posts capable of holding the filter disks in a stacked condition one above another and a plurality of horizontal arms adapted to support said vertical posts at their free ends, said horizontal arms extending radially outwardly from a common rotational shaft;
   a robotic carrier movable along a given path for transporting each of the filter disks from one station to another within said system;
   a first ultrasonic cleaner located adjacent to said turntable along the path of said robotic carrier for receiving the filter disk transported from said turntable and ultrasonically cleaning a first side of the filter disk;
   a second ultrasonic cleaner positioned adjacent to said first cleaner along the path of said robotic carrier for receiving the filter disk transported from said first cleaner and ultrasonically cleaning a second side of the filter disk;
   a water injection cleaner located adjacent to said second cleaner along the path of said robotic carrier for subjecting the filter disk transported from said second cleaner to a pressurized injection of water so as to remove residual contaminants from the ultrasonically cleaned filter disk; and
   means for controlling the supplying, cleaning and recovering operations of said system.

2. The system as recited in claim 1, wherein said vertical posts comprise six equally spaced vertical posts, each capable of functioning selectively as a supply post from which the filter disk is transported to said first cleaner and as a recovery post to which the filter disk is returned from said water injection cleaner.

3. An ultrasonic cleaner comprising means for cleaning filter disks which includes,
   a rigid frame;
   a basin mounted on said frame for containing a level of a cleaning liquid, said basin having a central hollow boss;
   a rotor concentrical with said basin and rotatable to cause a horizontally rotational movement of the filter disk, said rotor including an upper larger diameter extension and a lower smaller diameter extension, said upper extension having a disk landing surface, said lower extension being rotatably inserted through the hollow boss of said basin and said lower extension having an axial bore;
   means for causing said rotor to rotate with the filter disk located on the landing surface of said rotor;
   an elevator member including an elongated rod and a saddle carried on the top end of the rod, said elongated rod being inserted through the axial bore of the lower extension of said rotor, said elevator member movable between an uppermost position in which the filter disk is landed on the saddle and a lowermost position in which the filter disk undergoes said ultrasonic cleaning treatment;
   means for causing said elevator member to move between said uppermost and lowermost positions; and
   an ultrasonic applicator for applying an ultrasonic field to opposite sides of the filter disk as it horizontally rotates in said lowermost position.

4. The cleaner of claim 3, wherein said means for rotating the rotor comprises a worm wheel affixed concentrically to the lower extension of said rotor, a worm journalled through said frame to engage with the worm wheel and a motor for driving the worm.

5. The cleaner of claim 3 or 4, wherein said ultrasonic applicator comprises an ultrasonic vibrator movable toward or away from the filter disk positioned on the landing surface of said rotor.

* * * * *